US012696190B2

(12) United States Patent
Li

(10) Patent No.: US 12,696,190 B2
(45) Date of Patent: Jul. 28, 2026

(54) INFORMATION PROCESSING METHOD, COMMUNICATION DEVICE AND STORAGE MEDIUM

(71) Applicant: Beijing Xiaomi Mobile Software Co., Ltd., Beijing (CN)

(72) Inventor: Yanhua Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 748 days.

(21) Appl. No.: 17/921,847

(22) PCT Filed: Apr. 28, 2020

(86) PCT No.: PCT/CN2020/087593
§ 371 (c)(1),
(2) Date: Oct. 27, 2022

(87) PCT Pub. No.: WO2021/217452
PCT Pub. Date: Nov. 4, 2021

(65) Prior Publication Data
US 2023/0189145 A1 Jun. 15, 2023

(51) Int. Cl.
*H04W 52/00* (2009.01)
*H04W 52/02* (2009.01)
*H04W 76/28* (2018.01)

(52) U.S. Cl.
CPC ... *H04W 52/0219* (2013.01); *H04W 52/0216* (2013.01); *H04W 76/28* (2018.02)

(58) Field of Classification Search
CPC ............. H04W 76/28; H04W 52/0219; H04W 52/0229; H04W 52/0216; H04W 76/27
See application file for complete search history.

(56) References Cited

U.S. PATENT DOCUMENTS

| | | | |
|---|---|---|---|
| 2013/0163497 A1 | 6/2013 | Wei | |
| 2015/0351151 A1* | 12/2015 | Huang | H04W 24/08 |
| 2016/0192433 A1* | 6/2016 | Deenoo | H04W 24/08 |
| | | | 370/329 |
| 2016/0286603 A1 | 9/2016 | Vajapeyam et al. | |
| 2017/0019820 A1* | 1/2017 | Das | H04W 52/0216 |
| 2019/0191375 A1 | 6/2019 | Cheng et al. | |
| 2019/0349856 A1 | 11/2019 | Liu et al. | |

(Continued)

FOREIGN PATENT DOCUMENTS

| | | |
|---|---|---|
| CN | 105684499 A | 6/2016 |
| CN | 108924857 A | 11/2018 |

(Continued)

OTHER PUBLICATIONS

Ericsson, "Email report [107bis#49][NR TEI16] cDRX enhancement for CA", 3GPP TSG-RAN2 Meeting#108, R2-1915292, Nov. 18-22, 2019.

(Continued)

*Primary Examiner* — Marcus Smith
*Assistant Examiner* — Shivakrishna Vallamdasu
(74) *Attorney, Agent, or Firm* — Volpe Koenig

(57) ABSTRACT

An information processing method, including: reporting auxiliary information for at least two discontinuous reception (DRX) groups, where the auxiliary information is configured for a network to determine DRX configurations for the at least two DRX groups.

16 Claims, 6 Drawing Sheets

(56) References Cited

U.S. PATENT DOCUMENTS

| 2019/0387572 | A1  | 12/2019 | Nam et al. |
|---|---|---|---|
| 2020/0037396 | A1  | 1/2020  | Islam et al. |
| 2020/0045768 | A1* | 2/2020  | He ..................... H04W 76/28 |
| 2022/0264462 | A1* | 8/2022  | Bao ................ H04W 52/0216 |
| 2023/0007724 | A1* | 1/2023  | Li ...................... H04W 76/28 |

FOREIGN PATENT DOCUMENTS

| CN | 110520840 | A | 11/2019 |
|---|---|---|---|
| CN | 110536381 | A | 12/2019 |
| CN | 110546999 | A | 12/2019 |
| CN | 110574466 | A | 12/2019 |
| CN | 110691431 | A | 1/2020 |
| CN | 110754117 | A | 2/2020 |
| CN | 110830225 | A | 2/2020 |
| CN | 110972236 | A | 4/2020 |
| CN | 110999526 | A | 4/2020 |
| CN | 111034247 | A | 4/2020 |
| IN | 4626CHE2013 |   | 4/2015 |
| WO | 2018/204799 | A1 | 11/2018 |
| WO | 2020027955 | A2 | 2/2020 |

OTHER PUBLICATIONS

Qualcomm Incorporated, "UE Power Evaluation for DRX with Wake-Up Signaling", 3GPP TSG-RAN WG1#87, R1-1612068, Nov. 14-18, 2016.

OPPO. "Further considerations on secondary DRX group", 3GPP TSG-RAN WG2 Meeting #109 electronic, R2-2002836, Apr. 10, 2020. 6 pages.

Xiaomi Communications. "Discussion on PDCCH-WUS works with Dual DRX", 3GPP TSG-RAN WG2 #109bis-e, R2-2003103, Apr. 10, 2020.

Huawei, etc., "Report of [108#60][TEI16] DRX coordination", 3GPP TSG-RAN WG2 Meeting #109 electronic, R2-2001380, Feb. 14, 2020.

* cited by examiner

| Base station | | UE |
| --- | --- | --- |

S110: report auxiliary information for at least two discontinuous reception (DRX) groups, where the auxiliary information is configured for a network to determine DRX configurations for the at least two DRX groups

INFORMATION PROCESSING METHOD, COMMUNICATION DEVICE AND STORAGE MEDIUM

CROSS-REFERENCE TO RELATED APPLICATION

The present application is a U.S. National Stage of International Application No. PCT/CN2020/087593, filed on Apr. 28, 2020, the contents of all of which are incorporated herein by reference in their entirety for all purposes.

BACKGROUND

In order to satisfy the requirement for an increase in single-user peak rate and system capacity, carrier aggregation (CA) is introduced into R10 of long term evolution (LTE). The carrier aggregation is divided into continuous carrier aggregation and discontinuous carrier aggregation. For continuous carrier aggregation, a terminal only needs one transceiver, and for different bands of discontinuous carrier aggregation, different radio frequency (RF) chains are needed. Thus, different discontinuous reception (DRX) groups may be set according to different RF chains used by a user equipment (UE).

Different DRX groups share a set of DRX configurations, for example, use different onDurationTimers and DRX-Inactivity Timers. In this way, the onDurationTimers for different DRX groups are aligned. Typically, DRX Group 1 and DRX Group 2 are used for frequency range 1 (FR1) and frequency range 2 (FR2), i.e, for low and high frequency bands respectively. The same data are transmitted faster in FR2 because of a higher rate in the high frequency band. Even if short cycle parameters of these two DRX groups are configured separately.

In addition, UE auxiliary information is currently introduced into a power save project of communication protocol release (R) 16. In the power save project of R16, a wake-up signal (WUS) is further introduced. The WUS is also referred to as a wake-up signal. The WUS is configured to inform the UE whether to wake up for monitoring a physical downlink control channel (PDCCH) during next timing period of the onDurationTimer.

SUMMARY

The disclosure relates to, but is not limited to, the field of wireless communication, and in particular to an information processing method and apparatus, a communication device and a storage medium.

According to a first aspect of the examples of the disclosure, there is provided an information processing method. The information processing method is performed by a user equipment (UE) and includes: reporting auxiliary information for at least two discontinuous reception (DRX) groups, where the auxiliary information is configured for a network to determine DRX configurations for the at least two DRX groups.

According to a second aspect of the examples of the disclosure, there is provided an information processing method. The information processing method is performed by a base station and includes: receiving auxiliary information reported by a user equipment (UE) for at least two discontinuous reception (DRX) groups, where the auxiliary information is configured for a network to determine DRX configurations for the at least two DRX groups.

According to a third aspect of the examples of the disclosure, there is provided an information processing apparatus. The information processing apparatus is applied to a user equipment (UE) and includes: a reporting module configured to report auxiliary information for at least two discontinuous reception (DRX) groups, where the auxiliary information is configured for a network to determine DRX configurations for the at least two DRX groups.

According to a fourth aspect of the examples of the disclosure, there is provided an information processing apparatus. The information processing apparatus is applied to a base station and includes: a second receiving module configured to receive auxiliary information reported by a user equipment (UE) for at least two discontinuous reception (DRX) groups, where the auxiliary information is configured for a network to determine DRX configurations for the at least two DRX groups.

According to a fifth aspect of the examples of the disclosure, there is provided a communication device. The communication device includes:

a transceiver;

a memory; and a processor, where the processor is connected to the transceiver and the memory respectively, configured to control the transceiver to transceive a wireless signal by executing a computer-executable instruction stored in the memory, and is capable of implementing the method provided in the first aspect or the second aspect.

According to a sixth aspect of the examples of the disclosure, there is provided a non-transitory computer storage medium. The computer storage medium stores a computer-executable instruction, and when the computer-executable instruction is executed by a processor, the aforementioned methods provided in the first aspect or the second aspect can be implemented.

BRIEF DESCRIPTION OF THE DRAWINGS

The accompanying drawings, which are incorporated in the description and constitute a part of the description, illustrate examples consistent with the disclosure and serve to explain the principles of the examples of the disclosure along with the description.

DETAILED DESCRIPTION

A description will be made in detail to examples, instances of which are illustrated in the accompanying drawings. When the following description refers to the accompanying drawings, the same numbers in different accompanying drawings refer to the same or similar elements unless otherwise indicated. The implementations described in the following examples do not denote all implementations consistent with the examples of the disclosure. On the contrary, the implementations are merely examples of an apparatus and a method consistent with some aspects of the examples of the disclosure as detailed in the appended claims.

The terms used in the examples of the disclosure are for the purpose of describing specific examples merely and are not intended to be restrictive of the examples of the disclosure. The singular forms such as "a" and "this" used in the examples of the disclosure and the appended claims are also intended to include the plural forms, unless otherwise clearly stated in the context. It should be understood that the term "and/or" used here refers to and encompasses any of one or more of associated items listed or all possible combinations.

It should be understood that although the terms first, second, third, etc., may be employed in the examples of the disclosure to describe various information, this information should not be limited to this. These terms are merely used to distinguish the same type of information from one another. For example, the first information may also be referred to as second information, and similarly, the second information may also be referred to as first information, without departing from the scope of the examples of the disclosure. Depending on the context, the word "if" and "in case" as used here, may be interpreted as "at the time of," "when," or "in response to determining."

In order to better describe any one of the examples of the disclosure, an application scenario of an intelligent electric meter control system is taken as an example for illustration in an example of the disclosure.

Figures 1, 2:
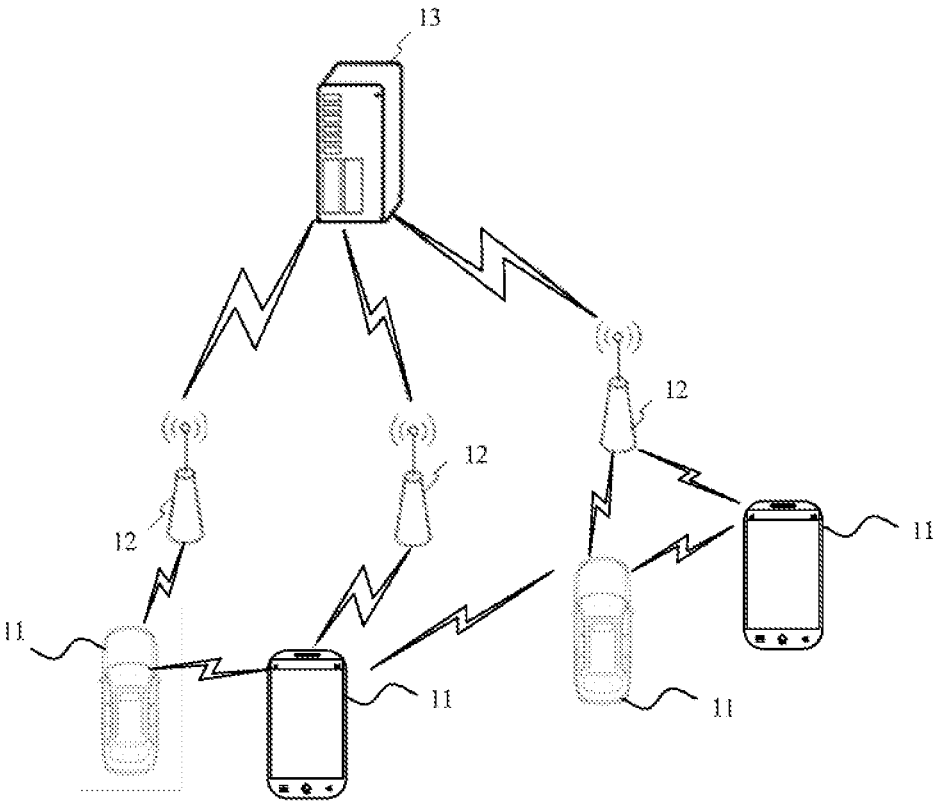
FIG. 1 is a schematic structural diagram of a wireless communication system according to an example.
FIG. 2 is a schematic flow chart of an information processing method according to an example.

With reference to FIG. 2, a schematic structural diagram of a wireless communication system according to an example of the disclosure is shown. As shown in FIG. 2, the wireless communication system is a communication system based on a cellular mobile communication technology. The wireless communication system may include more than one terminal 110 and more than one base station 120.

The terminal 110 may be a device that provides voice and/or data connectivity to a user. The terminal 110 may communicate with one or more core networks via a Radio Access Network (RAN). The terminal 110 may be an Internet of Things terminal, such as a sensor device, a mobile phone (or referred to as a "cellular" phone), and a computer having an Internet of Things terminal, for example, a stationary, portable, pocket-size, handheld, computer-built-in, or vehicle-mounted device. For example, the terminal 110 may be a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 110 may be a device of an unmanned aerial vehicle. Alternatively, the terminal 110 may be a vehicle-mounted device, for example, a trip computer with a wireless communication function or a wireless device externally connected with a trip computer. Alternatively, the terminal 110 may be a roadside equipment, such as a street lamp, a signal lamp, or other roadside equipment with a wireless communication function.

The base station 120 may be a network-side device in the wireless communication system. The wireless communication system can be a 4th generation mobile communication (4G) system, also known as a long term evolution (LTE) system. Alternatively, the wireless communication system may be a 5G system, also known as a new radio (NR) system or a 5G NR system. Alternatively, the wireless communication system may be a next-generation system of the 5G system. An access network in the 5G system can be called as New Generation-Radio Access Network (NG-RAN).

The base station 120 may be an evolved base station (eNB) adopted in the 4G system. Alternatively, the base station 120 may be a base station using a centralized-distributed architecture (gNB) in the 5G system. In the case that the base station 120 adopts the centralized-distributed architecture, the base station 120 generally includes a central unit (CU) and at least two distributed units (DUs). The central unit is provided with protocol stacks of a packet data convergence protocol (PDCP) layer, a radio link control (RLC) protocol layer and a media access control (MAC) layer. The distributed unit is provided with a protocol stack of a physical (PHY) layer. The implementation of the base station 120 is not limited in the examples of the disclosure.

Wireless connection can be established between the base station 120 and the terminal 110 through a wireless air interface. In various implementations, the wireless air interface is a wireless air interface based on a 4th generation mobile communication network technology (4G) standard. Alternatively, the wireless air interface is a wireless air interface based on a 5th generation mobile communication network technology (5G) standard, for example, the wireless air interface is a new radio. Alternatively, the wireless air interface may be a wireless air interface based on a next generation mobile communication network technology standard of 5G.

In some examples, an End to End (E2E) connection may also be established between the terminals 110, for example, vehicle-to-vehicle (V2V) communication, vehicle to infrastructure (V2I) communication, vehicle-to-pedestrian (V2P) communication and the like in Vehicle to Everything (V2X).

In some examples, the wireless communication system described above may further include a network management device 130.

The more than one base station 120 is respectively connected to the network management device 130. The network management device 130 may be a core network device in the wireless communication system. For example, the network management device 130 may be a mobility management entity (MME) in an evolved packet core (EPC) network. Alternatively: the network management device may be other core network devices, such as a serving gateway (SGW), a public data network gateway (PGW), a policy and charging rules function (PCRF) unit, a home subscriber server (HSS) or the like. The implementation of the network management device 130 is not limited in the examples of the disclosure.

In a scenario of CA, a WUS is transmitted only in a primary cell (Pcell), that is, the Pcell and a secondary cell (Scell) share a set of WUS configurations. That is, one wake-up bit is used to wake-up all Pcells and Scells. However, after dual DRX is introduced, because of the inconsistency of services of two DRX groups, it is not appropriate to wake-up all Pcells and Scells using one wake-up bit, and scheduling flexibility is lacked.

To this end, as shown in FIG. 2, an information processing method is provided according to an example of the disclosure. The information processing method is performed by a user equipment (UE) and includes step S110.

Step S110 includes reporting auxiliary information for at least two discontinuous reception (DRX) groups, where the auxiliary information is configured for a network to determine DRX configurations for the at least two DRX groups.

The UE may be various types of UEs, for example, a machine-type communication (MTC) UE or an Internet of Things (IoT) UE.

In an example, one UE may be configured with at least two DRX groups, and different DRX groups may correspond to different carriers. For example, according to the example of the disclosure. DRX groups corresponding to carrier information need to be reported respectively, and corresponding carriers may be discontinuous carriers.

Different DRX groups may correspond to different functional structures within the UE. In response to a DRX group entering an activation state, for example, entering the activation time of a DRX cycle corresponding to the DRX group, the functional structure configured to the DRX group by the UE exits from a sleep state and enters the activation state. In response to the DRX group being in the sleep state, the functional structure configured to the DRX group by the UE is also in the sleep state, such that power consumption of the UE may be saved.

The functional structure may include a transceiver within the UE, such as a radio frequency chain. For another example, the functional structure may further include a base band processor (BP) within the UE, etc.

In the case that more than one DRX group exists in one terminal, the terminal may report the auxiliary information for the more than one DRX groups, where the auxiliary information is used for configuring each DRX group to obtain DRX configurations. After the auxiliary information is reported to a network, a network element, such as a base station, may determine the DRX configuration for each DRX group within the terminal according to the auxiliary information.

The terminal may report, according to communication capabilities, service requirements and/or power consumption, and other conditions of the terminal, the DRX configurations expected for the at least two DRX groups by means of the auxiliary information. After receiving the auxiliary information, the base station may use the auxiliary information as a reference, and separately or uniformly configure each DRX group within the terminal on the basis of the auxiliary information. In summary. DRX configurations determined for different DRX groups within the terminal may adapt to current communication conditions of the terminal, including, but are not limited to the above-mentioned communication capabilities, service requirements, and/or power consumption, etc, of the UE.

The DRX configuration includes, but is not limited to timer configuration and/or wake-up-signal configuration.

The timer configuration includes, but is not limited to, at least one of the following:

a DRX cycle timer for timing a DRX cycle, where the DRX cycle includes, but is not limited to a DRX long cycle and/or a DRX short cycle, the DRX long cycle may be simply referred to as a long cycle, and the DRX short cycle may be simply referred to as a short cycle;

a timing configuration of an onDurationTimer for timing a duration in a wake-up state within one DRX cycle; and a timing configuration of a DRX-Inactivity Timer.

The longer the timing duration indicated by the timing configuration of the onDurationTimer is, the longer the duration for maintaining the wake-up state of the terminal in one DRX cycle is, and the shorter the duration for maintaining the sleep state of the terminal is.

The longer the timing duration indicated by the timing configuration of the DRX-Inactivity Timer, the longer the duration for maintaining the wake-up state after the UE completes uplink and downlink data transmission.

The wake-up-signal configuration includes, but is not limited to, at least one of the following:

a configuration of whether a wake-up signal is used; and a configuration of the number of the DRX cycles corresponding to the wake-up signal.

In some scenarios, the UE transceives data with a high frequency or has a high requirement for the delay of data transmission. In this case, the UE is configured to not use the wake-up signal, such that the UE may maintain the wake-up state in a wake-up period of the DRX cycle according to the DRX cycle, so as to transmit data in time.

In other scenarios, in the case that the current remaining power of the UE is low or the requirement for power consumption saving is strong, the UE is configured to use the wake-up signal. In this way, after receiving the wake-up signal, the UE may maintain the sleep state during the wake-up period of the DRX cycle indicated by the wake-up signal, so as to further save power consumption.

In the example of the disclosure, the DRX configurations for the more than one DRX groups in the terminal may be configured separately, or the same set of DRX configurations may be employed, and no matter which configuration manner is used, the terminal may report the auxiliary information for the DRX configuration expected by the terminal. The base station may use the auxiliary information as a reference, such that the DRX configuration issued by the base station satisfies the communication requirement of the terminal, thus ensuring the communication quality:

In an example, the auxiliary information may be configured to at least indicate whether the at least two DRX groups share the wake-up signal, or whether the at least two DRX groups share a wake-up bit in the same wake-up signal. The wake-up bit is configured to indicate the DRX group on which the received wake-up signal acts.

In this way, the wake-up-signal configurations for the at least two DRX groups in the same UE are separated, such that synchronous switching of state of two DRX groups in the same UE due to the same wake-up-signal configuration is decoupled.

In some examples, the auxiliary information includes at least one of the following:

first information configured to indicate that at least one of the DRX groups does not need to be configured with a short cycle;

second information configured to indicate that at least one of the DRX groups does not need to be configured with a wake-up signal; and third information configured to indicate whether at least two of the DRX groups share a wake-up bit carried by a wake-up signal, where the wake-up bit is configured to indicate whether the wake-up signal acts on the DRX group corresponding to the wake-up bit.

The wake-up bit is one or more bits carried in the wake-up signal. The wake-up bit is configured to indicate whether the UE is in the wake-up state or the sleep state within the timing duration of the onDurationTimer for the corresponding DRX cycle in response to the UE monitoring the corresponding wake-up signal.

In some examples, the auxiliary information may be any information used to configure the DRX groups.

For example, the first information includes one or more indication bits for indicating whether the short cycle needs to be configured.

Likewise, the second information may include one or more indication bits for indicating whether the wake-up signal needs to be configured.

In one example, the third information may include one or more indication bits for indicating whether different DRX groups share the wake-up bit carried by the wake-up signal. In response to different DRX groups sharing the wake-up bit carried by the wake-up signal, it is determined that the more than one DRX group corresponds to the same wake-up bit. In response to the more than one DRX group do not share the wake-up bit carried by the wake-up signal, it is determined that different DRX groups use the wake-up bits in the different wake-up signals, that is, different DRX groups each use the wake-up bit in the separate wake-up signal.

In response to different DRX groups do not share the wake-up bit, it is determined that the wake-up bits for different DRX groups are different, and after the wake-up signal is monitored, the DRX groups in which the monitored wake-up signal takes effect are different. In the case that M DRX groups are contained within the UE, and the M DRX groups share the same wake-up signal but do not share the same wake-up bit, the wake-up signal will carry M wake-up bits, and each of the M wake-up bits indicates whether one corresponding DRX group needs to maintain the sleep state within the wake-up period of corresponding DRX cycle according to the wake-up signal.

Figure 3:
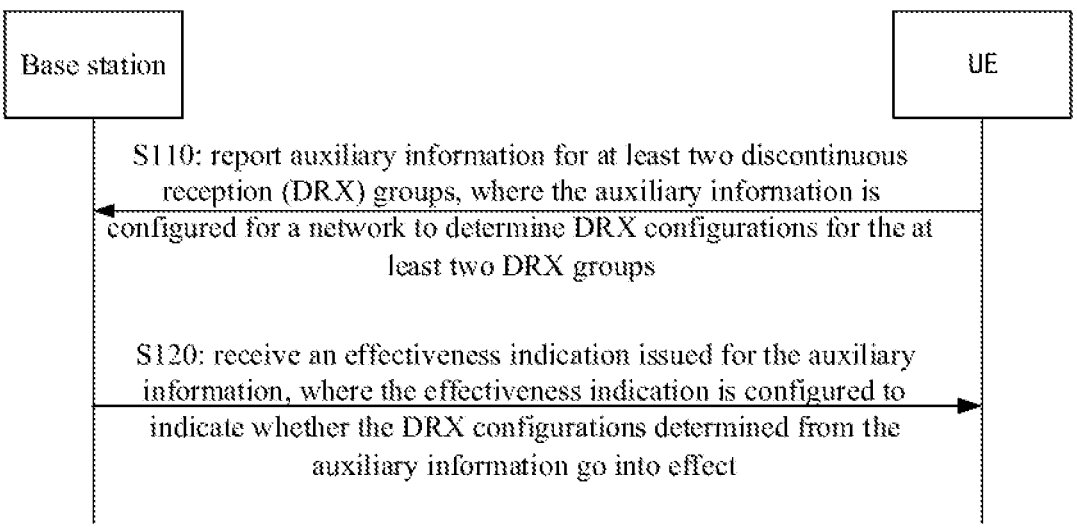
FIG. 3 is a schematic flow chart of an information processing method according to an example.

In some examples, as shown in FIG. 3, the method further includes steps S110 and S120.

Step S120 includes receiving an effectiveness indication issued for the auxiliary information, where the effectiveness indication is configured to indicate whether the DRX configurations determined from the auxiliary information go into effect.

For example, the base station may indicate, by issuing the effectiveness indication, to accept or reject the suggestion of the DRX configuration for each DRX group provided by the UE by means of the auxiliary information.

In the example of the disclosure, the effectiveness indication may include one or more indication bits, and the content of the effectiveness indication may include at least one of the following:

full agreement on the DRX configuration for each DRX group suggested by the UE by means of the auxiliary information;

full rejection of the DRX configuration for each DRX group suggested by the UE by means of the auxiliary information;

partial agreement on the DRX configuration for one or more DRX groups suggested by the UE by means of the auxiliary information; and partial rejection of the DRX configuration for one or more DRX groups suggested by the UE by means of the auxiliary information.

In an example, the effectiveness indication includes 1 indication bit, and two bit values of this indication bit may correspond to the full agreement and/or the full rejection described above.

In another example, the effectiveness indication includes more than one indication bit, and different indication bits may correspond to different DRX groups. In this way: different bit values of one indication bit may correspondingly indicate whether the DRX configuration for the corresponding DRX group suggested by the UE by means of the auxiliary information is agreed upon.

In another example, the effectiveness indication includes more than one indication bits, and different indication bits may correspondingly indicate whether different types of DRX configurations for the more than one DRX groups within the UE are agreed upon. For example, the timer configuration and the wake-up-signal configuration in the DRX configuration correspond to different indication bits. Different bit values of such indication bits may be configured to indicate whether the base station agrees to one DRX configuration for one or more DRX groups suggested by the UE by means of the auxiliary information. For example, the wake-up-signal configuration is agreed upon, and the timer configuration is rejected.

Figure 4:
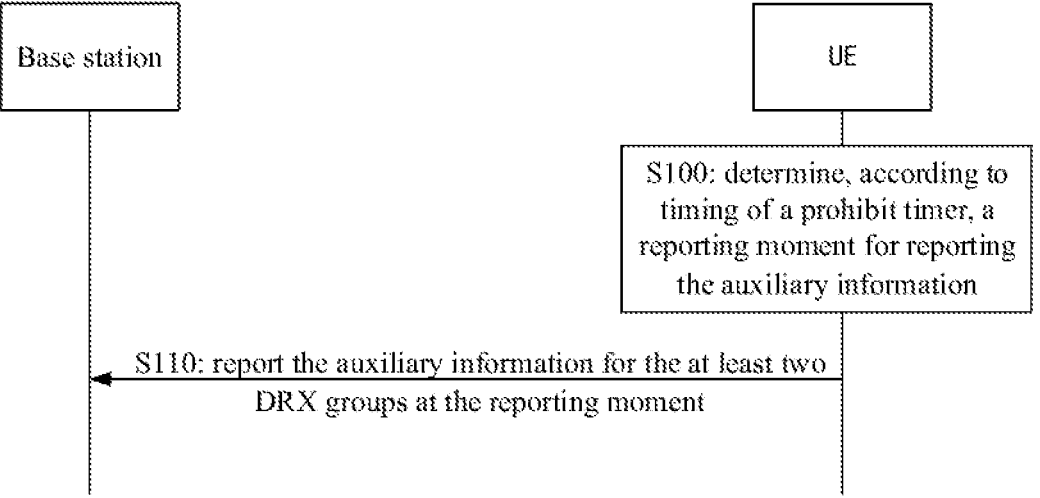
FIG. 4 is a schematic flow chart of an information processing method according to an example.

In some examples, as shown in FIG. 4, the method further includes steps S100 and S110.

Step S100 includes determining, according to the timing of a prohibit timer, a reporting moment for reporting the auxiliary information.

Step S110 may include reporting the auxiliary information for the at least two DRX groups at the reporting moment.

In the example of the disclosure, the prohibit timer is introduced to determine the reporting moment for the auxiliary information. In this way, confusion of wireless transmission caused by random reporting of the auxiliary information by the UE is reduced. Once the reporting moment is determined, the auxiliary information is reported in response to there being a DRX group needing to be reported, and the auxiliary information is not reported in response to there being no DRX group needing to be reported.

In the example of the disclosure, in the case that the prohibit timer is not timed out at the current moment, it is indicated that the current moment is within the timing range of the prohibit timer. In the case that the prohibit timer is timed out at the current moment, it is indicated that the current moment is outside the timing range of the prohibit timer. For example, in the case that the prohibit timer is not timed out at the moment when there is a requirement for updating the DRX configuration, it is indicated that the moment when there is the requirement for updating the DRX configuration is within the timing range of the prohibit timer. For another example, under the condition that the prohibit timer is timed out at the moment when a requirement for updating the DRX configuration exists, it is indicated that the moment when the requirement for updating the DRX configuration exists is outside the timing range of the prohibit timer.

In some examples, the timing duration of the prohibit timer may have an association with the duration of the DRX cycle. For example, the timing duration of the prohibit timer may be an integer multiple of the DRX cycle, and the prohibit timer may be set to timeout within the wake-up time of the DRX cycle. In this way, the UE may report the auxiliary information during the activation time of the DRX cycle, instead of reporting, when the UE is in the sleep time of the DRX cycle, the auxiliary information after the UE exits from the sleep state and is awakened due to the timeout of the prohibit timer, such that power consumption of the terminal may be further reduced.

Reporting of the auxiliary information may be a starting trigger event of the prohibit timer. For example, reporting of the auxiliary information may not be allowed within the timing range of the prohibit timer, and the next reporting of the auxiliary information is conducted after the prohibit timer is timed out.

In one example of the disclosure, a starting moment of the prohibit timer may be any moment negotiated or predetermined by the UE and the base station. For example, the starting moment may include, but is not limited to, a moment corresponding to the completion of updating of the DRX configuration for at least one DRX group.

In another example of the disclosure, the starting moment of the prohibit timer may be the starting and ending moment of a timing period. Any two adjacent timing periods may be consecutive or discrete (i.e., non-consecutive) in a time domain.

In some examples, determining, according to the timing of the prohibit timer, the reporting moment for reporting the auxiliary information includes: determining, in response to the at least two DRX groups sharing one prohibit timer, the reporting moment according to a DRX configuration updating requirement of the DRX groups and the timing of the prohibit timer shared by the at least two DRX groups.

In the case that the at least two DRX groups share one prohibit timer, the reporting moment for the auxiliary information and which DRX groups have the auxiliary information to be reported are determined according to the DRX configuration updating requirement of the DRX groups and the timing condition of the prohibit timer.

In an example, determining, in response to the at least two DRX groups sharing one prohibit timer, the reporting moment of the DRX group needing to report the auxiliary information according to the DRX configuration updating requirement of the DRX groups and the timing of the prohibit timer shared by the at least two DRX groups includes:

in response to the at least two DRX groups sharing one prohibit timer and at least one of the DRX groups having the requirement for updating the DRX configuration under the condition that the prohibit timer is not timed out, determining a moment when there is the requirement for updating the DRX configuration as the reporting moment for reporting the auxiliary information for the DRX group having the requirement for updating the DRX configuration; and determining, for the DRX group having no requirement for updating the DRX configuration under the condition that the prohibit timer is not timed out, a timeout moment of the prohibit timer as the reporting moment for reporting the auxiliary information for the DRX group having no requirement for updating the DRX configuration under the condition that the prohibit timer is not timed out.

Since the auxiliary information for the DRX group having the requirement for updating the DRX configuration is previously reported upon there is the requirement for updating the DRX configuration, thus the auxiliary information for the DRX group is reported only when the prohibit timer is timed out. Of course, the auxiliary information for the remaining DRX groups is also reported in the case that the prohibit timer is timed out and there has the requirement for updating.

In some examples, determining, in response to the at least two DRX groups sharing one prohibit timer, the reporting moment according to the DRX configuration updating requirement of the DRX groups and the timing of the prohibit timer shared by the at least two DRX groups includes: determining the current moment as the reporting moment for reporting the auxiliary information for the DRX group having the requirement for updating the DRX configuration in response to the at least two DRX groups sharing one prohibit timer and at least one of the DRX groups having the requirement for updating the DRX configuration; and determining, for the remaining DRX groups, the timeout moment of the prohibit timer as the reporting moment for reporting the auxiliary information for the DRX group needing to report the auxiliary information.

On one hand, in order to ensure that the auxiliary information for the DRX group having the requirement for updating the DRX configuration is reported in time, a moment when there is a requirement for updating the DRX configuration is determined as the reporting moment in response to one DRX configuration having the requirement for updating the DRX configuration within the timing range of the prohibit timer. On the other hand, for the auxiliary information for the DRX groups without an update of the DRX configuration within the timing range of the prohibit timer, the timeout moment of the prohibit timer is determined as the reporting moment. In this way, each DRX group has the reporting moment for reporting respective auxiliary information.

In some examples, determining, in response to the at least two DRX groups sharing one prohibit timer, the reporting moment according to the DRX configuration updating requirement of the DRX groups and the timing of the prohibit timer shared by the at least two DRX groups includes: in response to the at least two DRX groups sharing one prohibit timer and each DRX group having the requirement for updating the DRX configuration under the condition that the prohibit timer is not timed out, determining a moment when each DRX group has the requirement for updating the DRX configuration as the reporting moment for the auxiliary information corresponding to each DRX group.

The UE may determine, according to a requirement for data reporting and/or an energy storage condition of the UE, whether there is the requirement for updating the DRX configuration. For example, the UE determines, according to the amount of cached data in the UE, whether the DRX configuration for the DRX group needs to be adjusted (i.e., whether one or more DRX groups in the UE has the requirements for updating the DRX configuration), such that accumulated data may be reported as soon as possible, and data overflow caused by overlarge cached data is reduced.

For another example, the UE may determine, according to the urgency of a service corresponding to the data cached by the UE, whether a DRX cycle of the DRX group needs to be adjusted. For example, the urgency of the service corresponding to the currently cached data is very high, and if the currently cached data is not reported, safety accidents and other problems may be caused. For example, for an intelligent electric meter, an abnormity of electricity consumption is found by detecting electrical current, and an electricity accident may occur if the abnormity of electricity consumption is not reported as soon as possible. In this case, the intelligent electric meter may consider that the urgency of electricity consumption data cached in the intelligent electric meter is very high, the UE may enter the wake-up state as soon as possible by shortening the sleep time in the DRX configuration, so as to complete reporting of the urgent data.

Since the power consumption of the UE in the wake-up state is greater than the power consumption of the UE in the sleep state, the UE may further determine whether the current DRX configuration needs to be updated according to the storage condition of the UE.

For example, in the case that the UE enters a low-electricity-quantity state where an electricity quantity is already below a first electricity quantity threshold, the UE may consider that there is a need to prolong the sleep time in the DRX configuration which enables the UE to be in the sleep state (e.g., prolong the sleep time in the DRX cycle of one or more DRX groups). In this case, the UE considers that the DRX configuration for one or more DRX groups needs to be updated.

For another example, in the case that the UE is charged such that the UE exits from the low-electricity-quantity state and enters a high-electricity-quantity state where the electricity quantity is higher than a second electricity quantity threshold, the instantaneity of data transmission is more important for the UE. In this case, it is desirable to prolong the wake-up time in the DRX configuration which enables the UE to be in the wake-up state. In this case, the UE considers that the DRX configuration for one or more DRX groups needs to be updated.

In summary: in the examples of the disclosure, whether the DRX configuration for one DRX group needs to be updated may be correspondingly applied to various application scenarios, and may be determined by the UE itself, and the specific implementation is not limited here.

In one example, determining, in response to the at least two DRX groups sharing one prohibit timer, the reporting moment according to the DRX configuration updating requirement of the DRX groups and the timing of the prohibit timer shared by the at least two DRX groups includes determining the timeout moment of the prohibit timer as the reporting moment for the auxiliary information corresponding to each DRX group in response to the at least two DRX groups sharing one prohibit timer and at least one of the DRX groups having no requirement for updating the DRX configuration.

According to the example, another way of determining the reporting moment in the case that more than one DRX groups sharing one prohibit timer is provided. For example, in the case that a service of a certain DRX group is not urgent, reporting needs to wait until the prohibit timer is timed out even if this DRX group has the requirement for updating the DRX configuration.

In some examples, step S100 may include reporting, in response to the at least two DRX groups sharing one prohibit timer, the auxiliary information for each DRX group having the requirement for updating the DRX configuration via the same message.

In the case that more than one DRX group share one prohibit timer, the probability that the auxiliary information for the more than one DRX group will be reported at the same reporting moment is very large. In this case, in order to reduce the number of messages and reduce signaling overhead, the auxiliary information for each DRX group may be carried in the same message. In order to further reduce the bit overhead of the message, only the auxiliary information for the DRX group having the requirement for updating the DRX configuration may be carried in the message, and the auxiliary information for the DRX group having no requirement for updating the DRX configuration is not carried in the message. In this way: the length of the message is further reduced, and the bit overhead is further reduced.

In some examples, step S100 may include determining, in response to different DRX groups using different prohibit timers, the timeout moments of corresponding prohibit timers as the reporting moments of corresponding DRX groups.

Different DRX groups use different prohibit timers, i.e., more than one DRX groups in the terminal use different prohibit timers. In the case that N DRX groups are included in the terminal, it is possible that N prohibit timers are set in the terminal.

Each DRX group determines the reporting moment for respective auxiliary information according to the respective corresponding prohibit timer.

In some examples, in the case that the prohibit timer is timed out and the corresponding DRX group currently has no requirement for updating the DRX configuration, i.e., the UE wants to maintain the current DRX configuration for one or more DRX groups, the DRX configuration for the DRX group corresponding to expected location may be indicated by means of the auxiliary information.

In other examples, in the case that the prohibit timer is timed out and the corresponding DRX group currently has no requirement for updating the DRX configuration, i.e., the UE wants to maintain the current DRX configuration for one or more DRX groups, the UE may inform the base station of wanting to maintain the current DRX configuration for the corresponding one or more DRX groups by not reporting the auxiliary information.

In some examples, step S110 may include reporting, in response to different DRX groups using different prohibit timers, the auxiliary information for each DRX group via different messages.

In the case that there are S DRX groups in the UE and the S DRX groups use different prohibit timers, the auxiliary information for these DRX groups is reported in different messages, that is, the auxiliary information for each DRX group is reported in a respective separate message. In this way, the coupling of the auxiliary information for each DRX group is reduced, and the flexibility of reporting the message by each DRX group is improved.

In summary: in the examples of the disclosure, the DRX group having no requirement for updating the DRX configuration in the UE does not need to report the auxiliary information, such that the bit overhead is reduced as much as possible.

In some examples, the auxiliary information is carried in an information element (IE) of the DRX auxiliary information.

In an example, the DRX auxiliary information IE includes DRX preference information, and the auxiliary information may be one of such DRX preference information. The DRX auxiliary information IE includes the DRX preference information and other information except for the DRX preference information. In an example, the priority of the DRX preference information is higher than the priority of the other information except for the DRX preference information.

Figure 5:
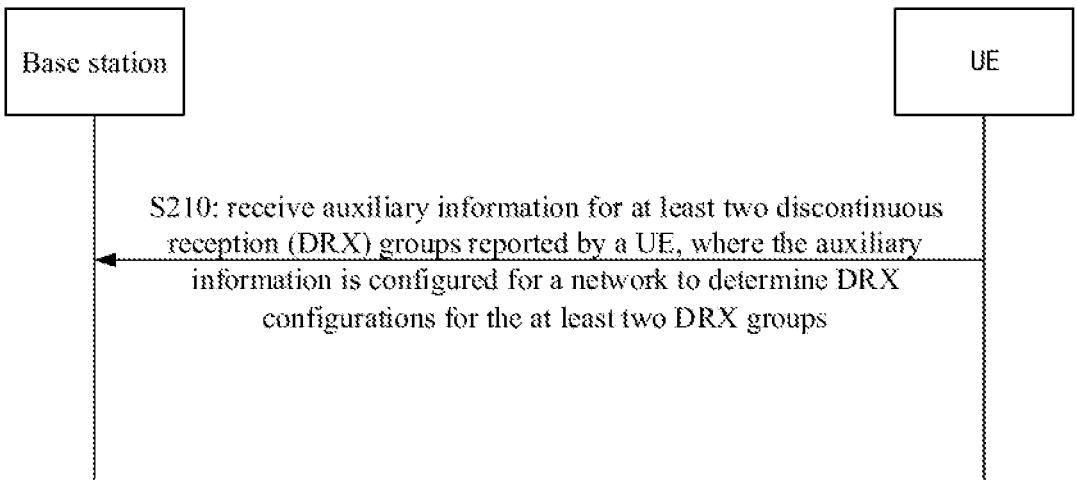
FIG. 5 is a schematic flow chart of an information processing method according to an example.

As shown in FIG. 5, an information processing method is shown according to an example. The information processing method is performed by a base station and includes step S210.

Step S210 includes receiving auxiliary information for at least two discontinuous reception (DRX) groups reported by a UE, where the auxiliary information is configured for a network to determine DRX configurations for the at least two DRX groups.

The base station may be various types of base stations, such as an evolved node B (eNB) or a next generation node B (gNB).

In the case that two or more DRX groups are configured in the UE, the base station may receive the auxiliary information reported for one or more DRX groups.

The auxiliary information may be configured for the base station to determine wake-up-signal configurations in the DRX configurations for the at least two DRX groups. For example, the auxiliary information may be configured for the base station to determine whether wake-up-signal configuration needs to be conducted on both DRX configurations, and/or whether a wake-up bit of a wake-up signal is shared.

After the base station receives the auxiliary information, the base station may configure the DRX configuration for each DRX group in the UE respectively, such that the DRX configuration determined by the base station for each DRX group in the UE is suitable for the current communication requirement of the UE, the wireless communication environment condition and/or the communication requirement of the base station, etc., thus enabling the DRX configurations to precisely satisfy the service requirements.

In some examples, the auxiliary information includes at least one of the following:

first information configured to indicate that at least one of the DRX groups does not need to be configured with a short cycle;

second information configured to indicate that at least one of the DRX groups does not need to be configured with a wake-up signal; and third information configured to indicate whether at least two of the DRX groups share a wake-up bit carried by the wake-up signal, where the wake-up bit is configured to indicate whether the wake-up signal acts on the DRX group corresponding to the wake-up bit.

In the examples of the disclosure, the first information, the second information and the third information may include one or more indication bits for indicating corresponding information.

In the examples of the disclosure, the first information, the second information and the third information are equivalent to report different levels of DRX configurations for each DRX group expected by the UE, such that the base station may conveniently determine the DRX configuration for each DRX group in the UE according to the information contained in the auxiliary information.

Figure 6:
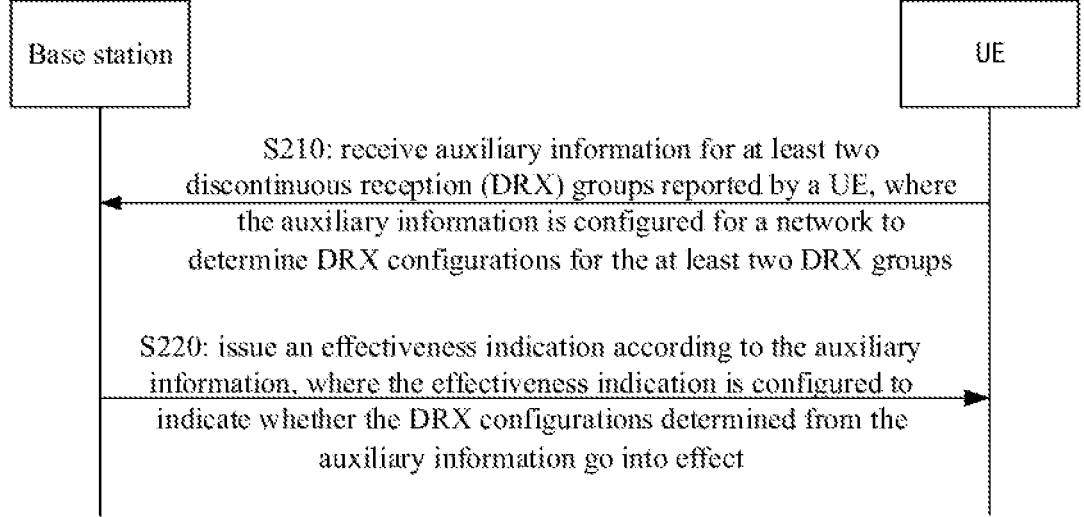
FIG. 6 is a schematic flow chart of an information processing method according to an example.

In some examples, as shown in FIG. 6, the method further includes steps S110 and S220.

Step S220 includes issuing an effectiveness indication according to the auxiliary information, where the effectiveness indication is configured to indicate whether the DRX configurations determined from the auxiliary information go into effect.

In the examples of the disclosure, in the case that the base station receives the auxiliary information and determines to use the DRX configuration recommended by the auxiliary information, the base station may directly inform the UE by issuing the effectiveness indication.

such that the configuration of each DRX configuration in the UE is simply and conveniently completed.

In some examples, the effectiveness indication includes:

a first indication configured to indicate that at least one of the DRX groups is not configured with a short cycle;

a second indication configured to indicate that at least one of the DRX groups is not configured with a wake-up signal; and a third indication configured to indicate whether at least two of the DRX groups share a wake-up bit carried by the wake-up signal, where the wake-up bit is configured to indicate whether the wake-up signal acts on the DRX group corresponding to the wake-up bit.

The auxiliary information is reported by the UE according to the DRX configurations expected by different levels in a targeted manner, and the effectiveness indication may also be issued in a targeted manner, thus facilitating the decoding of the UE.

In some examples, the auxiliary information for different DRX groups within the UE may be carried in one message or in different messages.

For example, the auxiliary information for more than one DRX groups that share one prohibit timer to determine the reporting moment may be carried in one message to be reported, thus reducing the number of reporting by the UE and the number of reported messages. In this way: the base station may achieve reception of the auxiliary information for more than one DRX groups within the UE by receiving one message.

For another example, in the case that each DRX group has a separate prohibit timer, the auxiliary information for each DRX group is carried in different messages. In this way, the base station receives the auxiliary information for each DRX group by receiving different messages.

In some examples, the DRX configuration may further include an updating configuration, where the updating configuration may include a prohibit timer configuration, and the prohibit timer configuration may include timing information and/or sharing configuration of the prohibit timer. The sharing configuration indicates whether more than one DRX groups share a prohibit timer. In the case that more than one DRX groups do not share a prohibit timer, it is indicated that different DRX groups use separate (i.e., different) prohibit timers.

The timing information includes, but is not limited to, duration information.

In some examples, the updating configuration may be issued to the UE by the base station or be predefined in a communication protocol.

For example, the base station may determine the updating configuration according to the capabilities of the UE, the type of the UE, and/or the type of services transmitted by different DRX groups. Once determined, the updating configuration may be sent to the corresponding UE in various ways, such as through system messages or radio resource control (RRC) messages.

In summary: the base station and the UE may acquire the updating configuration in a variety of ways, which are not limited to any of the ways described above.

In some examples, the auxiliary information is carried in an information element (IE) of the DRX auxiliary information.

For example, the auxiliary information is one of DRX preference information in the DRX auxiliary information IE.

Figure 7:
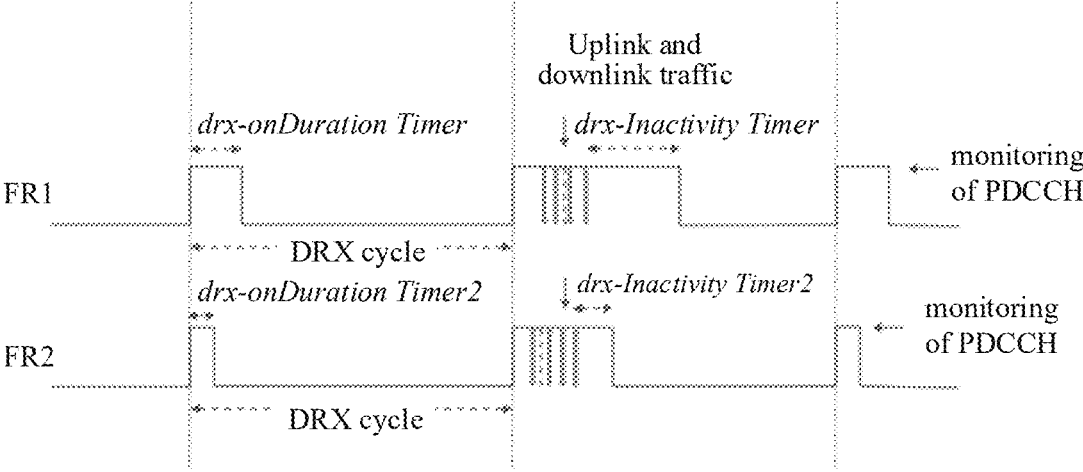
FIG. 7 is a schematic comparison diagram of DRX configurations for more than one DRX group according to an example.

In an example, in order to satisfy the requirement for an increase in single-user peak rate and system capacity, carrier aggregation (CA) is introduced into R10 of long-term evolution (LTE). The carrier aggregation is divided into continuous carrier aggregation and discontinuous carrier aggregation. For continuous carrier aggregation, the terminal only needs one transceiver, and for different bands of discontinuous carrier aggregation, different radio frequency (RF) chains are needed. Thus, different DRX groups may be set according to different RF chains used by the UE. Different DRX groups share a set of DRX parameters, for example, with reference to FIG. 7, use different onDurationTimers and DRX-Inactivity Timers. However, the onDurationTimers are aligned. Typically, DRX Group 1 and DRX Group 2 are used for the frequency range 1 (FR1) and frequency range 2 (FR2), i.e., for low and high-frequency bands, respectively.

The same data are transmitted faster in FR2 because of a higher rate in the high-frequency band. Thus, even short cycle parameters of these two DRX groups are configured separately, the onDurationTimer and the DRX-Inactivity Timer on FR2 are shorter than the onDurationTimer and the DRX-Inactivity Timer on FR1 according to latest meeting conclusions. Other parameters are all the same.

In addition. UE auxiliary information is currently introduced into a power save project of communication protocol release (R) 16. In the power save project of R16, a wake-up signal (WUS) is further introduced. The WUS is configured to inform the UE whether to wake-up for monitoring a physical downlink control channel (PDCCH) during next timing period of the onDurationTimer. On the basis of the latest meeting conclusions, in a scenario of CA, the WUS is transmitted only in a primary cell (Pcell), that is, the Pcell and a secondary cell (Scell) share a set of WUS configurations. That is, one wake-up bit is used to wake-up all Pcells and Scells. However, after dual DRX is introduced, because of the inconsistency of services of two DRX groups, it is not appropriate to wake-up all Pcells and Scells using one wake-up bit, and scheduling flexibility is lacking. Thus, it is quite possible that each DRX group needs to use its own wake-up bit, in addition to the original auxiliary information introduced for the UE.

In this example, the auxiliary information reported by the UE may indicate whether two DRX groups share the wake-up signal and/or share the wake-up bit in the same wake-up signal.

For example, the UE reports the auxiliary information for a scenario of dual DRX groups to a network, so as to assist the network to configure the dual DRX groups. The auxiliary information includes one or more of the following:

a certain DRX group does not need to use a short cycle, that is, the configured short cycle does not take effect in this DRX group, which is suitable for a scenario of sparse transmission of services on the DRX group;

a certain DRX group does not use a wake-up signal during a short cycle; and the UE reports whether two DRX groups share a wake-up bit in the wake-up signal or separately use the wake-up bit.

In an example, the auxiliary information may be added in IE DRX-Reference of the original DRX auxiliary information.

For example, in the case that the base station accepts the configuration request in the auxiliary information of the UE, a new indication bit needs to be added in a radio message to inform the UE whether the request of the UE goes into effect. This indication is one of the aforementioned effectiveness indications.

For another example, the UE is informed that a certain DRX group does not need to use the short cycle. That is, after the indication bit is received by the UE, the configured short cycle does not take effect for the certain DRX group and only takes effect for another DRX group.

For another example, the UE is informed that a certain DRX group does not use the wake-up signal during the short cycle. That is, after the indication bit is received by the UE, the DRX onduration is always enabled in the certain DRX group, i.e., the certain DRX group does not comply with the behavior indicated by a detected wake-up bit.

For another example, the UE is informed whether two DRX groups share the wake-up bit in the wake-up signal or separately use the wake-up bit in the wake-up signal. For example, the base station may inform the UE to use a new wake-up-signal format, i.e., a new wake-up bit for another DRX group is appended to original wake-up signal.

For another example, the UE may report the auxiliary information for perDRX group by sharing one prohibit timer.

In an example, the auxiliary information for each DRX group may be reported in one message at the same time. There is no need for reporting the auxiliary information for DRX groups having no change. For DRX groups having no change in DRX configuration, the auxiliary information may be reported when the prohibit timer is timed out.

In an example, the auxiliary information for each DRX group may be reported in different messages. In this case, the reporting of the auxiliary information is triggered as long as there is an update for one group; and reporting of the auxiliary information for the other group needs to wait until the timer is timed out.

For another example, the UE may report the auxiliary information for each DRX group by using respective separate prohibit timer, i.e., triggering of reporting the auxiliary information for the two DRX groups is completely separate and does not interfere with each other.

Figure 8:
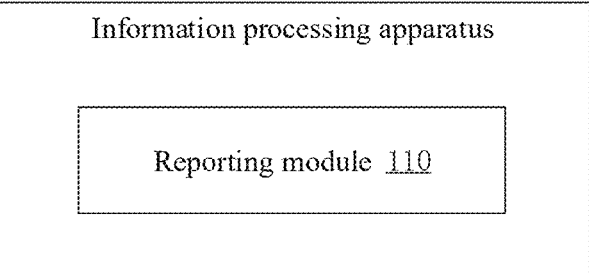
FIG. 8 is a schematic structural diagram of an information processing apparatus according to an example.

As shown in FIG. 8, there is provided an information processing apparatus according to an example. The information processing apparatus is applied to a user equipment (UE) and includes: a reporting module 110 configured to report auxiliary information for at least two discontinuous reception (DRX) groups, where the auxiliary information is configured for a network to determine DRX configurations for the at least two DRX groups.

In some examples, the reporting module 110 may be a program module. After the program module is processed by a processor, reporting of the auxiliary information for the at least two DRX groups may be implemented.

In other examples, the reporting module 110 may be a software-and-hardware-combined module. The software-and-hardware-combined module includes, but is not limited to various programmable arrays. The programmable arrays include, but are not limited to, a complex programmable array or a complex programmable array.

In still other examples, the reporting module 110 may be a pure hardware module. The pure hardware module includes, but is not limited to an application specific integrated circuit.

In some examples, the auxiliary information includes at least one of the following:

first information configured to indicate that at least one of the DRX groups does not need to be configured with a short cycle;

second information configured to indicate that at least one of the DRX groups does not need to be configured with a wake-up signal; and third information configured to indicate whether at least two of the DRX groups share a wake-up bit carried by a wake-up signal or employ separate wake-up bit in the wake-up signal, where the wake-up bit is configured to indicate whether the wake-up signal acts on the DRX group corresponding to the wake-up bit.

In some examples, the apparatus further includes a first receiving module configured to receive an effectiveness indication issued for the auxiliary information, where the effectiveness indication is configured to indicate whether the DRX configurations determined from the auxiliary information go into effect.

In some examples, the apparatus further includes a determination module configured to determine, according to the timing of a prohibit timer, a reporting moment for reporting the auxiliary information.

The reporting module 110 is configured to report the auxiliary information for the at least two DRX groups at the reporting moment.

In some examples, the determination module is configured to determine, in response to the at least two DRX groups sharing one prohibit timer, the reporting moment according to the DRX configuration updating requirement of the DRX groups and the timing of the prohibit timer shared by the at least two DRX groups.

In some examples, the determination module is configured to determine, in response to the at least two DRX groups sharing one prohibit timer and at least one of the DRX groups having the requirement for updating the DRX configuration under the condition that the prohibit timer is not timed out, a moment when there is the requirement for updating the DRX configuration as the reporting moment for reporting the auxiliary information for the DRX group having the requirement for updating the DRX configuration; and determine, for the DRX group having no requirement for updating the DRX configuration under the condition that the prohibit timer is not timed out, a timeout moment of the prohibit timer as the reporting moment for reporting the auxiliary information for the DRX group having no requirement for updating the DRX configuration under the condition that the prohibit timer is not timed out.

In some examples, the determination module is configured to determine, in response to the at least two DRX groups sharing one prohibit timer and none of the DRX groups having the requirement for updating the DRX configuration under the condition that the prohibit timer is not timed out, the timeout moment of the prohibit timer as the reporting moment.

In other examples, the determination module is configured to determine, in response to the at least two DRX groups sharing one prohibit timer and each DRX group having the requirement for updating the DRX configuration under the condition that the prohibit timer is not timed out, a moment when each DRX groups has the requirement for updating the DRX configuration as the reporting moment for the auxiliary information corresponding to each DRX groups.

In some examples, the determination module is configured to report, in response to at least two of the DRX groups sharing one prohibit timer, the auxiliary information for each DRX group having the requirement for updating the DRX configuration via the same message.

In some examples, the determination module is configured to determine, in response to different DRX groups using different prohibit timers, the timeout moments of corresponding prohibit timers as the reporting moments of corresponding DRX groups.

In some examples, the determination module is configured to report, in response to different DRX groups using different prohibit timers, the auxiliary information for each DRX group via different messages.

In some examples, the auxiliary information is carried in an information element (IE) of the DRX auxiliary information.

Figure 9:
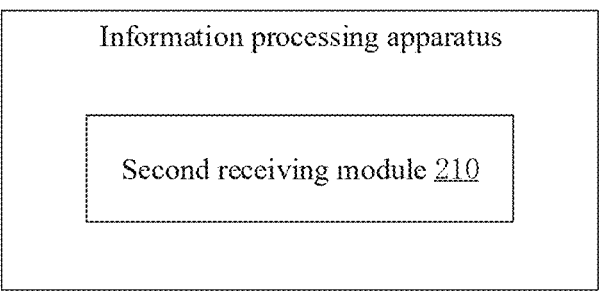
FIG. 9 is a schematic structural diagram of an information processing apparatus according to an example.

As shown in FIG. 9, an information processing apparatus is provided according to an example. The information processing apparatus is applied to a base station and includes: a second receiving module 210 configured to receive auxiliary information for at least two discontinuous reception (DRX) groups reported by a user equipment (UE), where the auxiliary information is configured for a network to determine DRX configurations for the at least two DRX groups.

In some examples, the second receiving module 210 may be a program module. After the program module is processed by a processor, reception of the auxiliary information for the at least two DRX groups may be implemented.

In other examples, the second receiving module 210 may be a software-and-hardware-combined module. The software-and-hardware-combined module includes, but is not limited to various programmable arrays. The programmable arrays include, but are not limited to, a complex programmable array or a complex programmable array.

In still other examples, the second receiving module 210 may be a pure hardware module. The pure hardware module includes, but is not limited to, an application specific integrated circuit.

In some examples, the auxiliary information includes at least one of the following:
   first information configured to indicate that at least one of the DRX groups does not need to be configured with a short cycle;
   second information configured to indicate that at least one of the DRX groups does not need to be configured with a wake-up signal; and
   third information configured to indicate whether at least two of the DRX groups share a wake-up bit carried by a wake-up signal, where the wake-up bit is configured to indicate whether the wake-up signal acts on the DRX group corresponding to the wake-up bit.

In some examples, the apparatus further includes an issuing module configured to issue an effectiveness indication according to the auxiliary information, where the effectiveness indication is configured to indicate whether the DRX configurations determined from the auxiliary information go into effect.

In some examples, the effectiveness indication includes:
   a first indication configured to indicate that at least one of the DRX groups is not configured with a short cycle;
   a second indication configured to indicate that at least one of the DRX groups is not configured with a wake-up signal; and
   a third indication configured to indicate whether at least two of the DRX groups share a wake-up bit carried by a wake-up signal, where the wake-up bit is configured to indicate whether the wake-up signal acts on the DRX group corresponding to the wake-up bit.

In some examples, the auxiliary information is carried in an information element (IE) of the DRX auxiliary information.

There is provided a communication device according to an example of the disclosure. The communication device includes a processor, a transceiver, a memory, and an executable program, where the executable program is stored on the memory and runnable by the processor. When running the executable program, the processor executes an information processing method applied to a UE and provided by any of the aforementioned technical solutions or executes an information processing method applied to a base station and provided by any of the aforementioned technical solutions.

The communication device may be the aforementioned base station or UE.

The processor may include various types of storage media. The storage media are non-transitory computer storage media that may continue to remember information stored after the communication device is powered off. The communication device includes the base station or the UE.

The processor may be connected to the memory via a bus, etc, for reading the executable program stored on the memory, such as shown in at least one of FIG. 2 to FIG. 6.

There is provided a computer storage medium according to an example of the disclosure. The computer storage medium stores an executable program. After the executable program is executed by a processor, the method shown in any technical solution of the first aspect or the second aspect may be implemented, such as the method shown in at least one of FIG. 2 to FIG. 6.

Figure 10:
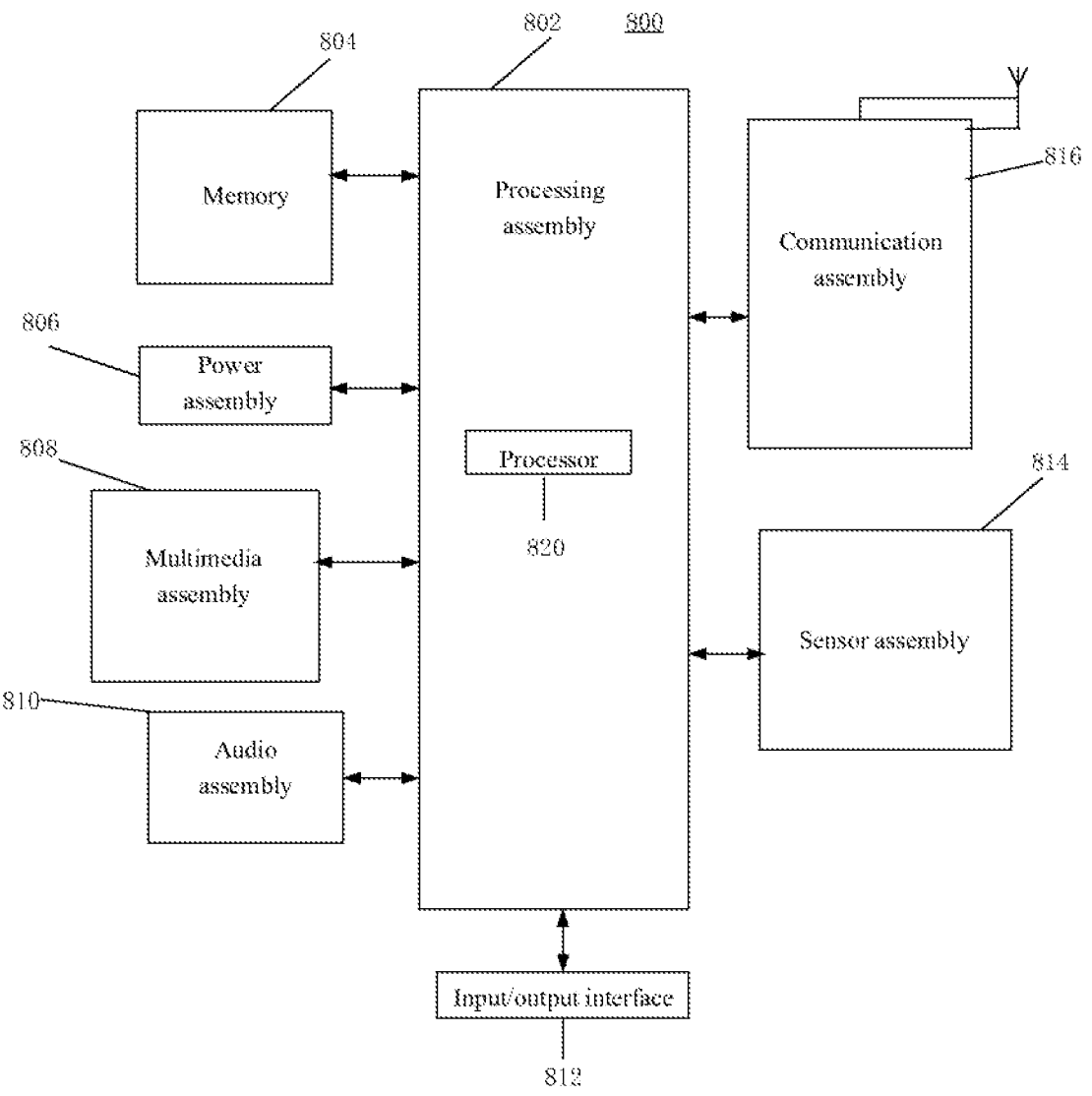
FIG. 10 is a schematic structural diagram of a user equipment (UE) according to an example.

FIG. 10 is a block diagram of a UE 800 according to an example. For example, the UE 800 may be a mobile phone, a computer, a digital broadcast user equipment, a messaging device, a gaming console, a tablet device, a medical device, a fitness device, a personal digital assistant, etc.

With reference to FIG. 10, the UE 800 may include at least one of the following assemblies: a processing assembly 802, a memory 804, a power assembly 806, a multimedia assembly 808, an audio assembly 810, an input/output (I/O) interface 812, a sensor assembly 814, and a communication assembly 816.

Generally, the processing assembly 802 controls an overall operation of the UE 800, such as operations associated with display, telephone calls, data communication, a camera operation, and a recording operation. The processing assembly 802 may include at least one processor 820 to execute instructions so as to complete all or some of steps of the methods described above. In addition, the processing assembly 802 may include at least one module that facilitates interaction between the processing assembly 802 and other assemblies. For example, the processing assembly 802 may include a multimedia module to facilitate interaction between the multimedia assembly 808 and the processing assembly 802.

The memory 804 is configured for storing various types of data to support the operations at the UE 800. Instances of these data include instructions of any application or method operated on the UE 800, contact data, phonebook data, messages, pictures, videos, etc. The memory 804 may be implemented through any type or combination of volatile or non-volatile memory devices, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power assembly 806 provides power for various assemblies of the UE 800. The power assembly 806 may include a power supply management system, at least one power supply, and other assemblies associated with power generation, management, and distribution for the UE 800.

The multimedia assembly 808 includes a screen that provides an output interface between the UE 800 and a user. In some examples, the screen may include a liquid crystal display (LCD) and a touch panel (TP). If the screen includes a touch panel, the screen may be implemented as a touch screen so as to receive an input signal from a user. The TP includes at least one touch sensor to sense touch, swipe, and gestures on the TP. The touch sensor may sense not only a boundary of a touch or swipe, but also wake-up time and pressure associated with the touch or swipe. In some examples, the multimedia assembly 808 includes a front camera and/or a rear camera. When the UE 800 is in an operation mode, such as a photographing mode or a video mode, the front camera and/or the rear camera may receive external multimedia data. Each of the front camera and the rear camera may be a fixed optical lens system or have a focal length and an optical zoom capacity.

The audio assembly 810 is configured for outputting and/or inputting audio signals. For example, the audio assembly 810 includes a microphone (MIC) configured to receive an external audio signal when the UE 800 is in operation modes, such as a call mode, a recording mode, and a voice recognition mode. The received audio signal may be further stored in the memory 804 or transmitted via the communication assembly 816. In some examples, the audio assembly 810 further includes a speaker for outputting the audio signal.

The I/O interface 812 provides an interface between the processing assembly 802 and a peripheral interface module such as a keyboard, a click wheel, a button, etc. These buttons may include, but are not limited to a home button, a volume button, a start button, and a lock button.

The sensor assembly 814 includes at least one sensor for providing state assessments of various aspects of the UE 800. For example, the sensor assembly 814 may detect an on/off state of the device 800 and the relative positioning of the assemblies. For example, the assemblies are a display and a keypad of the UE 800. The sensor assembly 814 may also detect a change in position of the UE 800 or an assembly of the UE 800, the presence or absence of contact between the user and the UE 800, orientation or acceleration/deceleration of the UE 800, and temperature variation of the UE 800. The sensor assembly 814 may include a proximity sensor configured for assessing the presence of a nearby object in the absence of any physical contact. The sensor assembly 814 may further include a light sensor, such as a complementary metal oxide semiconductor (CMOS) or a charged coupled device (CCD) image sensor for imaging applications. In some examples, the sensor assembly 814 may further include an acceleration sensor, a gyroscopic sensor, a magnetic sensor, a pressure sensor, or a temperature sensor.

The communication assembly 816 is configured for facilitating wired or wireless communication between the UE 800 and other devices. The UE 800 may access a wireless network based on a communication standard, such as WiFi. 2G, or 3G, or their combination. In an example, the communication assembly 816 receives a broadcast signal or broadcast related information from an external broadcast management system by means of a broadcast channel. In an example, the communication assembly 816 also includes a near field communication (NFC) module to facilitate short-range communication. For example, the NFC module may be implemented based on a radio frequency identification (RFID) technology, an infrared data association (IrDA) technology: an ultra-wide-band (UWB) technology, a Bluetooth (BT) technology, and other technologies.

In an example, the UE 800 may be implemented by at least one application specific integrated circuit (ASIC), a digital signal processor (DSP), a digital signal processing device (DSPD), a programmable logic devices (PLD), a field programmable gate arrays (FPGA), a controller, a microcontroller, a microprocessor and other electronic elements for executing the methods described above.

In an example, there is further provided a non-transitory computer-readable storage medium including instructions, for example, a memory 804 including instructions. The instructions are executable by the processor 820 of the UE 800, to complete the methods described above. For example, the non-transitory computer-readable storage medium may be a read-only memory (ROM), a random access memory (RAM), a compact disc read-only memory (CD-ROM), a magnetic tape, a floppy disk, an optical data storage device, etc.

Figure 11:
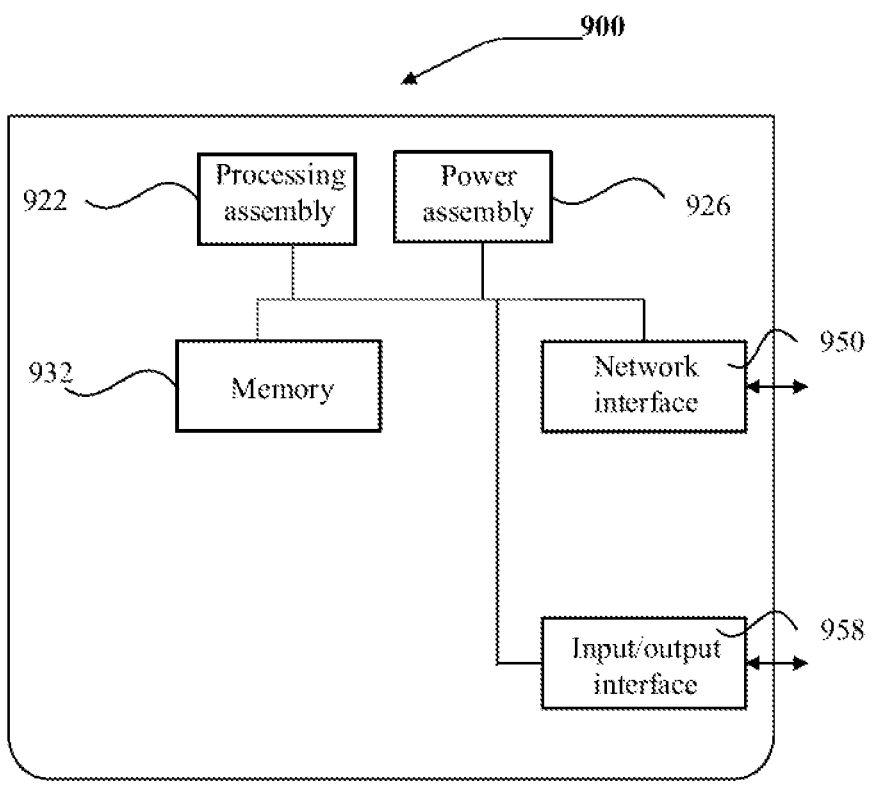
FIG. 11 is a schematic structural diagram of a base station according to an example.

As shown in FIG. 11, a structure of a base station is illustrated according to an example of the disclosure. For example, a base station 900 may be provided as a network device. With reference to FIG. 11, the base station 900 includes: a processing assembly 922 which further includes at least one processor; and a memory resource represented by a memory 932 for storing instructions that are executable by the processing assembly 922, such as applications. The applications stored in the memory 932 may include one or more modules, each of which corresponds to a set of instructions. In addition, the processing assembly 922 is configured to execute an instruction, so as to execute any aforementioned method which is applied in the base station, such as the methods shown in FIG. 2 to FIG. 6.

The base station 900 may further include a power assembly 926 configured for executing power supply management of the base station 900, a wired or wireless network interface 950) configured for connecting the base station 900 to a network, and an input/output (I/O) interface 958. The base station 900 may operate based on an operation system stored in the memory 932, such as windows Server™, Mac OS X™, Unix™, Linux™, FreeBSD™, etc.

According to the technical solutions provided by the examples of the disclosure, the UE may report the auxiliary information for at least two DRX groups in the UE. After the auxiliary information is reported to a base station, the base station may use the auxiliary information as a reference and separately configure or uniformly configure the DRX groups in a terminal on the basis of the auxiliary information. In summary, DRX configurations determined for different DRX groups within the terminal may adapt to current communication conditions of the terminal, including, but are not limited to, the above-mentioned communication capabilities, service requirements and/or power consumption, etc, of the UE.

Other implementations to the disclosure will be easily conceived by those skilled in the art in consideration of the description and practice of the disclosure disclosed here. The disclosure is intended to cover any variations, uses, or adaptive changes of the disclosure following the general principles of the disclosure and including common general knowledge or conventional technical means within the present technical field not disclosed in the disclosure. The description and the examples are deemed exemplary only, and the true scope and spirit of the disclosure are indicated by the following claims.

It should be understood that the disclosure is not limited to precise structures which have been described above and shown in the accompanying drawings, and may have various modifications and changes without departing from the scope of the disclosure. The scope of the disclosure is limited by the appended claims only.

What is claimed is:

1. A method for information processing, performed by a user equipment (UE) and comprising:

reporting auxiliary information for at least two discontinuous reception (DRX) groups, wherein the auxiliary information is configured for a network to determine DRX configurations for the at least two DRX groups;

wherein the auxiliary information comprises at least one of:

first information configured to indicate that at least one of the DRX groups does not need to be configured with a short cycle;

second information configured to indicate that at least one of the DRX groups does not need to be configured with a wake-up signal; or third information configured to indicate whether at least two of the DRX groups share a wake-up bit carried by the wake-up signal, wherein the wake-up bit is configured to indicate whether the wake-up signal acts on the DRX group corresponding to the wake-up bit;

wherein the method further comprises: determining, according to timing of a prohibit timer, a reporting moment for reporting the auxiliary information;

wherein reporting the auxiliary information for the at least two DRX groups comprises: reporting the auxiliary information for the at least two DRX groups at the reporting moment; and wherein determining, according to the timing of the prohibit timer, the reporting moment for reporting the auxiliary information comprises: determining, in response to the at least two DRX groups sharing one prohibit timer, the reporting moment according to a DRX configuration updating requirement of the DRX groups and the timing of the prohibit timer shared by the at least two DRX groups.

2. The method according to claim 1, further comprising:

receiving an effectiveness indication issued for the auxiliary information, wherein the effectiveness indication is configured to indicate whether the DRX configurations determined from the auxiliary information go into effect.

3. The method according to claim 1, wherein determining, in response to the at least two DRX groups sharing the one prohibit timer, the reporting moment according to the DRX configuration updating requirement of the DRX groups and the timing of the prohibit timer shared by the at least two DRX groups comprises;

in response to the at least two DRX groups sharing the one prohibit timer and at least one of the DRX groups having a requirement for updating the DRX configuration under a condition that the prohibit timer is not timed out, determining a moment when there is the DRX configuration updating requirement as the reporting moment for reporting the auxiliary information for the DRX group having the DRX configuration updating requirement; and in response to there being no DRX group having the DRX configuration updating requirement under the condition that the prohibit timer is not timed out, determining a timeout moment of the prohibit timer as the reporting moment for reporting the auxiliary information for the DRX group having no DRX configuration updating requirement under the condition that the prohibit timer is not timed out.

4. The method according to claim 1, wherein determining, in response to the at least two DRX groups sharing the one prohibit timer, the reporting moment according to the DRX configuration updating requirement of the DRX groups and the timing of the prohibit timer shared by the at least two DRX groups comprises:

in response to the at least two DRX groups sharing the one prohibit timer and each DRX group having the DRX configuration updating requirement under a condition that the prohibit timer is not timed out, determining a moment when each DRX group has the DRX configuration updating requirement as the reporting moment for the auxiliary information corresponding to each DRX group.

5. The method according to claim 1, wherein reporting the auxiliary information for the at least two DRX groups comprises:

reporting, in response to at least two of the DRX groups sharing the one prohibit timer, the auxiliary information for each DRX group having the DRX configuration updating requirement via the same message.

6. The method according to claim 1, wherein determining, according to the timing of the prohibit timer, the reporting moment of the DRX group needing to report the auxiliary information, comprises:

determining, in response to different DRX groups using different prohibit timers, timeout moments of corresponding prohibit timers as the reporting moments of corresponding DRX groups.

7. The method according to claim 6, wherein reporting the auxiliary information for the at least two DRX groups comprises:

reporting, in response to different DRX groups using different prohibit timers, the auxiliary information for each DRX group via different messages.

8. The method according to claim 1, wherein the auxiliary information is carried in an information element (IE) of the DRX auxiliary information.

9. A method for information processing, performed by a base station and comprising:

receiving auxiliary information for at least two discontinuous reception (DRX) groups reported by a user equipment (UE), wherein the auxiliary information is configured for a network to determine DRX configurations for the at least two DRX groups, and wherein receiving the auxiliary information for the at least two DRX groups comprises receiving the auxiliary information for the at least two DRX groups at a reporting moment for reporting the auxiliary information by the UE, wherein the reporting moment for reporting the auxiliary information is determined by the UE according to timing of a prohibit timer;

wherein the reporting moment for reporting the auxiliary information is further determined by the UE, in response to the at least two DRX groups sharing one prohibit timer, according to a DRX configuration updating requirement of the DRX groups and the timing of the prohibit timer shared by the at least two DRX groups, wherein the auxiliary information comprises at least one of:

first information configured to indicate that at least one of the DRX groups does not need to be configured with a short cycle;

second information configured to indicate that at least one of the DRX groups does not need to be configured with a wake-up signal; or third information configured to indicate whether at least two of the DRX groups share a wake-up bit carried by the wake-up signal, wherein the wake-up bit is configured to indicate whether the wake-up signal acts on the DRX group corresponding to the wake-up bit.

10. The method according to claim 9, further comprising:

issuing an effectiveness indication according to the auxiliary information, wherein the effectiveness indication is configured to indicate whether the DRX configurations determined from the auxiliary information go into effect.

11. The method according to claim 10, wherein the effectiveness indication comprises:

a first indication configured to indicate that at least one of the DRX groups is not configured with the short cycle;

a second indication configured to indicate that at least one of the DRX groups is not configured with the wake-up signal; and a third indication configured to indicate whether at least two of the DRX groups share the wake-up bit of the wake-up signal, wherein the wake-up bit is configured to indicate whether the wake-up signal acts on the DRX group corresponding to the wake-up bit.

12. The method according to claim 9, wherein the auxiliary information is carried in an information element (IE) of the DRX auxiliary information.

13. A communication device, comprising:

a transceiver;

a memory; and a processor, where the processor is connected to the transceiver and the memory respectively, and the processor is configured to control the transceiver to transceive a wireless signal and to report auxiliary information for at least two discontinuous reception (DRX) groups, wherein the auxiliary information is configured for a network to determine DRX configurations for the at least two DRX groups;

wherein the processor is further configured to determine, according to timing of a prohibit timer, a reporting moment for reporting the auxiliary information;

wherein reporting the auxiliary information for the at least two DRX groups comprises: reporting the auxiliary information for the at least two DRX groups at the reporting moment;

wherein determining, according to the timing of the prohibit timer, the reporting moment for reporting the auxiliary information comprises: determining, in response to the at least two DRX groups sharing one prohibit timer, the reporting moment according to a DRX configuration updating requirement of the DRX groups and the timing of the prohibit timer shared by the at least two DRX groups;

wherein the auxiliary information comprises at least one of:

first information configured to indicate that at least one of the DRX groups does not need to be configured with a short cycle;

second information configured to indicate that at least one of the DRX groups does not need to be configured with a wake-up signal; or third information configured to indicate whether at least two of the DRX groups share a wake-up bit carried by the wake-up signal, wherein the wake-up bit is configured to indicate whether the wake-up signal acts on the DRX group corresponding to the wake-up bit.

14. A non-transitory computer storage medium storing computer-executable instructions, the computer-executable instructions when executed by a processor cause the processor to execute the method according to claim 1.

15. A communication device, comprising:

a transceiver;

a memory that stores computer executable instructions; and a processor connected to the transceiver and the memory respectively, and wherein the computer executable instructions when executed by the processor, cause the communication device to act as the base station and perform the method according to claim 9.

16. A non-transitory computer storage medium storing computer-executable instructions, the computer-executable instructions when executed by a processor of the base station cause the base station to perform the method according to claim 9.

\* \* \* \* \*